United States Patent

Gutierrez-Castaneda et al.

(10) Patent No.: US 8,332,080 B2
(45) Date of Patent: Dec. 11, 2012

(54) METHOD AND DEVICE TO ASSIST IN NAVIGATION IN AN AIRPORT SECTOR

(75) Inventors: Manuel Gutierrez-Castaneda, Toulouse (FR); Stéphane Paris, Tournefeuille (FR)

(73) Assignee: Thales, Neuilly sur Seine (FR)

( * ) Notice: Subject to any disclaimer, the term of this patent is extended or adjusted under 35 U.S.C. 154(b) by 1091 days.

(21) Appl. No.: 12/134,684

(22) Filed: Jun. 6, 2008

(65) Prior Publication Data

US 2008/0306638 A1 Dec. 11, 2008

(30) Foreign Application Priority Data

Jun. 8, 2007 (FR) ...................................... 07 04112

(51) Int. Cl.
*G06F 17/00* (2006.01)

(52) U.S. Cl. ............... 701/3; 701/120; 342/29; 342/36; 244/175; 244/182

(58) Field of Classification Search ............ 701/3, 200, 701/120, 122, 8; 342/36, 29; 340/945; 244/175, 244/182; *G01C 23/00; G06F 17/00*
See application file for complete search history.

(56) References Cited

U.S. PATENT DOCUMENTS

| | | | |
|---|---|---|---|
| 6,405,107 B1 * | 6/2002 | Derman .......................... | 701/3 |
| 6,675,095 B1 * | 1/2004 | Bird et al. ...................... | 701/301 |
| 6,816,780 B2 * | 11/2004 | Naimer et al. ................. | 701/467 |
| 7,176,937 B2 * | 2/2007 | Gannon ......................... | 345/592 |
| 7,382,285 B2 * | 6/2008 | Horvath et al. ............... | 340/961 |
| 7,389,163 B1 * | 6/2008 | Colich ............................. | 701/8 |
| 7,437,225 B1 * | 10/2008 | Rathinam ........................ | 701/14 |
| 7,477,985 B2 * | 1/2009 | Shirley et al. ................. | 701/120 |
| 7,493,196 B2 * | 2/2009 | Caillaud et al. ................... | 701/3 |
| 7,724,177 B2 * | 5/2010 | Bunch et al. ................. | 342/26 R |
| 7,761,194 B2 * | 7/2010 | Winkler et al. ................... | 701/3 |
| 8,027,758 B2 * | 9/2011 | Ferro et al. ..................... | 701/18 |
| 2003/0122701 A1 * | 7/2003 | Tran ................................. | 342/29 |
| 2005/0066275 A1 * | 3/2005 | Gannon ......................... | 715/700 |
| 2007/0250223 A1 * | 10/2007 | Francois et al. ................. | 701/9 |
| 2008/0004792 A1 * | 1/2008 | Wise et al. ..................... | 701/120 |

FOREIGN PATENT DOCUMENTS

EP 1684144 A1 7/2006

OTHER PUBLICATIONS

Frezza, R, "Path following for air vehicles in coordinated flight", Publication Year: 1999, pp. 884-889.*
Hanna, S., Sadeghian, S., Datt, K., Mosquera, I., Khoi Vu, Donohue, G.L, Mulkerin, T.P, "Flight conflict management system (FCMS): the design of a low altitude general aviation free flight zone, air", Publication Year: 2003, pp. 51-56.*

* cited by examiner

*Primary Examiner* — Tuan C. To
(74) *Attorney, Agent, or Firm* — Lowe, Hauptman, Ham & Berner LLP

(57) ABSTRACT

The invention relates to a method and device to assist in navigation in an airport sector. The inventive method and device make it possible to automatically calculate the points of intersection between the path of the flight plan and the zones having speed limitations all around an airport and calculate a speed profile conforming to these limitations. The inventive method and device also make it possible to use an automatic guidance automatically defining flight instructions corresponding to the calculated speed profile. Furthermore, the invention calculates predictions concerning the flight parameters.

20 Claims, 4 Drawing Sheets

METHOD AND DEVICE TO ASSIST IN NAVIGATION IN AN AIRPORT SECTOR

RELATED APPLICATIONS

The present application is based on, and claims priority from, French Application Number 07 04112, filed Jun. 8, 2007, the disclosure of which is hereby incorporated by reference herein in its entirety.

TECHNICAL FIELD

The invention relates to the management of the flight of an aircraft and more particularly the regulation of its speed all around an airport.

BACKGROUND OF THE INVENTION

The speed limitations around airports are currently dependent on the altitude of the aircraft. Such speed limitations are then expressed as follows: limitation of 250 knots under the altitude of 10 000 feet. The navigation databases are provided with fields indicating for an airport the speed limitations according to the altitude which is applied to it. The speed limitations for the climb phase are known by the expression "climb speed limit". The speed limitations for the descent phase are known by the expression "Des speed limit".

There are, however, some airports for which the regulations do not limit the speed according to an altitude, but according to the position of the aircraft relative to one or more zones established around the airport. Such is the case in particular in Istanbul, Turkey, where the speed must be below 250 knots at less than 50 Nm (nautical miles) from the airport, under 220 knots at less than 30 Nm. In this example, the limitation zones are defined by concentric circles around the airport.

Moreover, some crews choose a speed limitation of the aircraft according to the position of the aircraft relative to the air traffic control zones, rather than according to the altitude of the aircraft in order to better control their arrival in the terminal zone.

For this, the crews have two solutions. The first solution involves using instruments to monitor the position of the aircraft relative to the zones concerned, and manually manage the speed limitation. The second solution involves introducing fixed waypoints into the flight plan, corresponding to the places where the original path enters into the zones concerned, and manually defining speed constraints.

These two solutions are not entirely satisfactory because they are not automated and they induce an increase in the workload of the pilot in descent and approach phases. When the pilot defines waypoints with speed constraints and his flight plan is modified during descent or approach, the duly defined waypoints can become erroneous. The pilot is then obliged to redefine waypoints and associated speed constraints.

Finally, in these manual flight phases, the flight management system FMS supplies predictions, notably concerning flight time and fuel consumption, based on the assumption that the speed is managed by the automatic pilot. These predictions cannot therefore exactly reflect reality.

SUMMARY OF THE INVENTION

The invention aims to overcome the abovementioned problems by proposing a method and device for automatically computing the points of intersection between the path of the flight plan and the zones having speed limitations around an airport and for computing a speed profile conforming to these limitations. The inventive method and device also make it possible to use an automatic guidance automatically defining flight instructions corresponding to the calculated speed profile. Furthermore, the invention calculates predictions concerning the flight parameters. The advantage of the invention is that it considerably lightens the workload of the pilot to manage speed limitations by zones. By applying the inventive method and device, the work of the pilot is limited to a selection of the type of limitation (according to altitude or zones) before the take-off at the moment when the flight plan is entered, or during the flight when his workload is reduced. The inventive method can also be applied to a device for preparing missions on the ground to prepare flights in airport zones having speed limitations.

Not only does the invention have the advantage of lightening the workload of the pilots, but it also produces data (points locating the changes of speed) that are reliable compared to an approximate mental calculation which is normally performed by the pilot. The invention enables the FMS to reliably establish a path and predictions as far as the destination, which take into account all the successive speed limitations. Such is not the case in flight management systems according to the prior art; in fact the paths and these predictions calculated by the flight management systems according to the prior art take into account only a single speed limitation, namely that actually imposed by the crew at a given instant, on the one hand, and, on the other hand, are made to conform with the successive speed limitations only when the pilot imposes it manually. The invention therefore makes it possible to incorporate in the path and the predictions all the speed limitations defined from the current airplane position to the destination.

To this end, the subject of the invention is a method to assist in navigation in an airport sector including an airport, said sector comprising zones having predefined contours, said zones being nested within each other so that each of said zones entirely contains the zones of smaller size, said zones containing said airport and being associated with speed limitations, each zone having a speed limitation lower than the speed limitations of the zones in which it is included, wherein it comprises the automatic calculation of a speed profile observing said speed limitations and comprising the following steps:

calculation of a lateral path of the flight plan,
calculation of the points of intersection between said path and the contours of said zones,
calculation of zone change points from said points of intersection,
calculation of speed change points from said zone change points.

According to a variant of the invention, said airport is the origin airport of the aircraft and said aircraft is in climbing phase, a zone change point representing the transition from a first zone to a second zone including said first zone and being the point of intersection between, on the one hand, the path and, on the other hand, the contour of said first zone, the most downstream on said path, corresponding to a definitive exit from said first zone.

Advantageously, the speed change points are acceleration start points and are placed at the zone change points.

According to another variant of the invention, said airport is the destination airport of the aircraft and said aircraft is in descent phase, a zone change point representing the transition from a first zone to a second zone included in said first zone, being the point of intersection between, on the one hand, the path and, on the other hand, the contour of said second zone, the most upstream on said path, corresponding to a first entry into said second zone.

Advantageously, the speed change points are deceleration start points and are placed on the path upstream of the zone change points so as to form a deceleration segment.

Advantageously, the method to assist in navigation in an airport sector according to the invention also comprises a step for calculating flight parameters notably comprising speed, trim and thrust.

Advantageously, the method to assist in navigation in an airport sector according to the invention also comprises a step for calculating and displaying predictions of parameters associated with the flight profile such as fuel consumption, flight time and predicted speed at each characteristic point of the flight plan.

Advantageously, a speed limitation associated with a zone is a value defined by default.

Advantageously, a speed limitation associated with a zone is entered manually by the pilot.

Advantageously, the speed limitations associated with the zones are dependent on the performance characteristics of the aircraft.

Advantageously, the method to assist in navigation in an airport sector according to the invention also comprises an automatic guidance step defining a flight profile conforming to the computed flight parameters.

Advantageously, the method to assist in navigation in an airport sector according to the invention is used in flight.

Advantageously, the method to assist in navigation in an airport sector according to the invention is used on the ground for mission preparation.

The invention also relates to a device to assist in navigation in an airport sector implementing the method to assist in navigation according to the invention, which comprises:
- means for automatically calculating a speed profile conforming to said speed limitations and notably comprising the calculation of speed change points,
- means for calculating flight parameters notably comprising speed, trim and thrust,
- means for calculating predictions of parameters associated with the flight profile such as fuel consumption and flight time.

Advantageously, the device to assist in navigation in an airport sector according to the invention also comprises means for selecting the type of speed limitation: dependent on a limitation zone or dependent on an altitude.

Advantageously, the device to assist in navigation in an airport sector according to the invention also comprises means for inputting and displaying a speed limitation.

Advantageously, the device to assist in navigation in an airport sector according to the invention also comprises means for displaying speed limitation zones.

Advantageously, the device to assist in navigation in an airport sector according to the invention also comprises means for guidance and it belongs to a flight management system FMS of an aircraft.

Advantageously, the device to assist in navigation in an airport sector according to the invention belongs to equipment to assist in mission preparation.

Advantageously, the device to assist in navigation in an airport sector according to the invention also comprises means of transmitting to a flight management system FMS.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The description below presents, by way of nonlimiting exemplary embodiment, the application of the inventive method in a flight management system FMS. However, the inventive method can also be applied to a mission preparation device enabling the pilot to create a flight plan on the ground before the aircraft takes off. Such a mission preparation device presents features similar to those of a flight management system FMS, apart from the guidance and the data links. Thus, the method to assist in navigation according to the invention can be applied in flight in an FMS or on the ground in mission preparation aid equipment.

Figure 1:
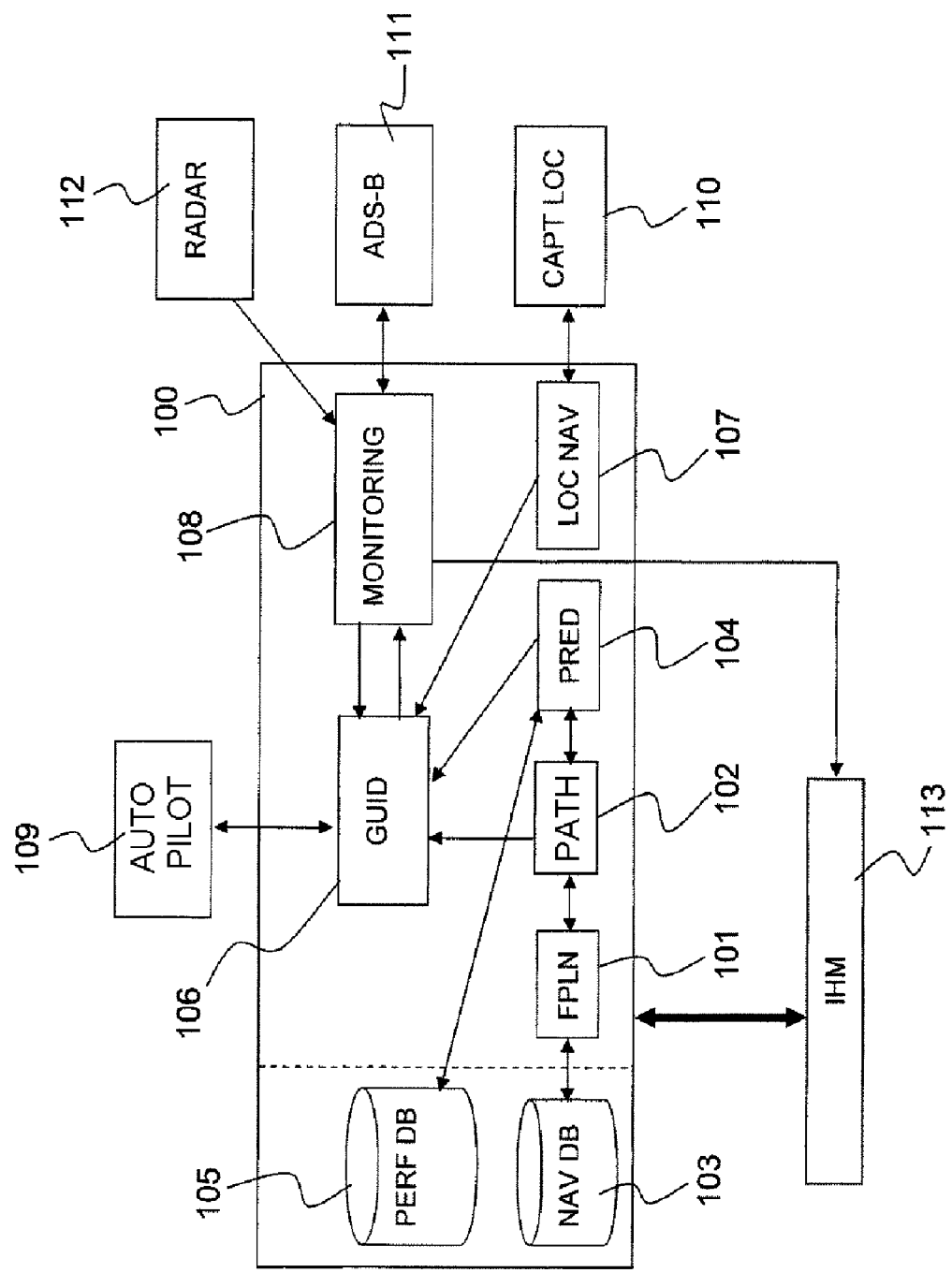
FIG. 1 represents a flight management system architecture according to the prior art.

Generally, an FMS architecture 100, illustrated in FIG. 1, comprises a set of functions and a set of databases such as context monitoring 108, guidance 106, predictions 104 notably concerning flight time and fuel consumption, flight plan 101 consisting of a series of points and segments linking them, calculation of the path 102 from the elements of the flight plan and instructions to follow the flight plan, and locating 107. The set of databases notably comprises a navigation database 103 and a performance database 105 containing various aircraft characteristics and limits.

The FMS 100 is interfaced with an automatic pilot 109, sensors 110 for locating, a digital link 111 with other airplanes called ADS-B standing for Automatic Dependent Surveillance Broadcast, and a weather radar 112. The FMS can be controlled by a man-machine interface 113 notably comprising screens and keyboards.

An exemplary embodiment of the inventive method in the architecture presented makes it possible to take into account speed limitations by zone around an airport in the flight plan 101, path calculation 102, guidance 106 and prediction 104 modules. The information concerning the zones is stored in the navigation database 103.

The inventive method takes into account several speed limitation zones. Each of them fully contains the smaller zones. There are therefore no intersections between the zones. One particular case is speed limitation by circular zones. The speed limitations are established according to the distance between the aircraft and the airport and define one or several concentric circles centered on the airport concerned. However, the inventive method can also be applied to any polygonal zones not having the same centers.

The first step of the inventive method consists in calculating the lateral path of the flight plan. This calculation depends on the lateral structure of the flight plan and the current aircraft parameters such as altitude, mass, configuration of the leading edge slats and high-lift flaps. The calculation is based on speeds calculated by the FMS, such as the economic speed (commonly abbreviated "Econ Speed") given by the airplane performance characteristics, and speed constraints linked to waypoints deriving from the flight plan.

The second step of the inventive method consists in calculating the points of intersection between the path and the contours of the speed limitation zones. The only points of intersection considered "valid" are those that are preceded by an end of flight segment located inside (respectively outside) the zone concerned, and followed by an end of flight segment located outside (respectively inside) the zone concerned. The other points of intersection of the path with the zone contours are considered as overruns of the path inside or outside the zones.

The next two steps of the inventive method include two different variants. The first variant of the inventive method applies when the airport is the origin airport of the aircraft and said aircraft is in climb phase. The second variant of the inventive method applies when the airport is the destination airport of the aircraft and said aircraft is in descent phase.

Figure 2:
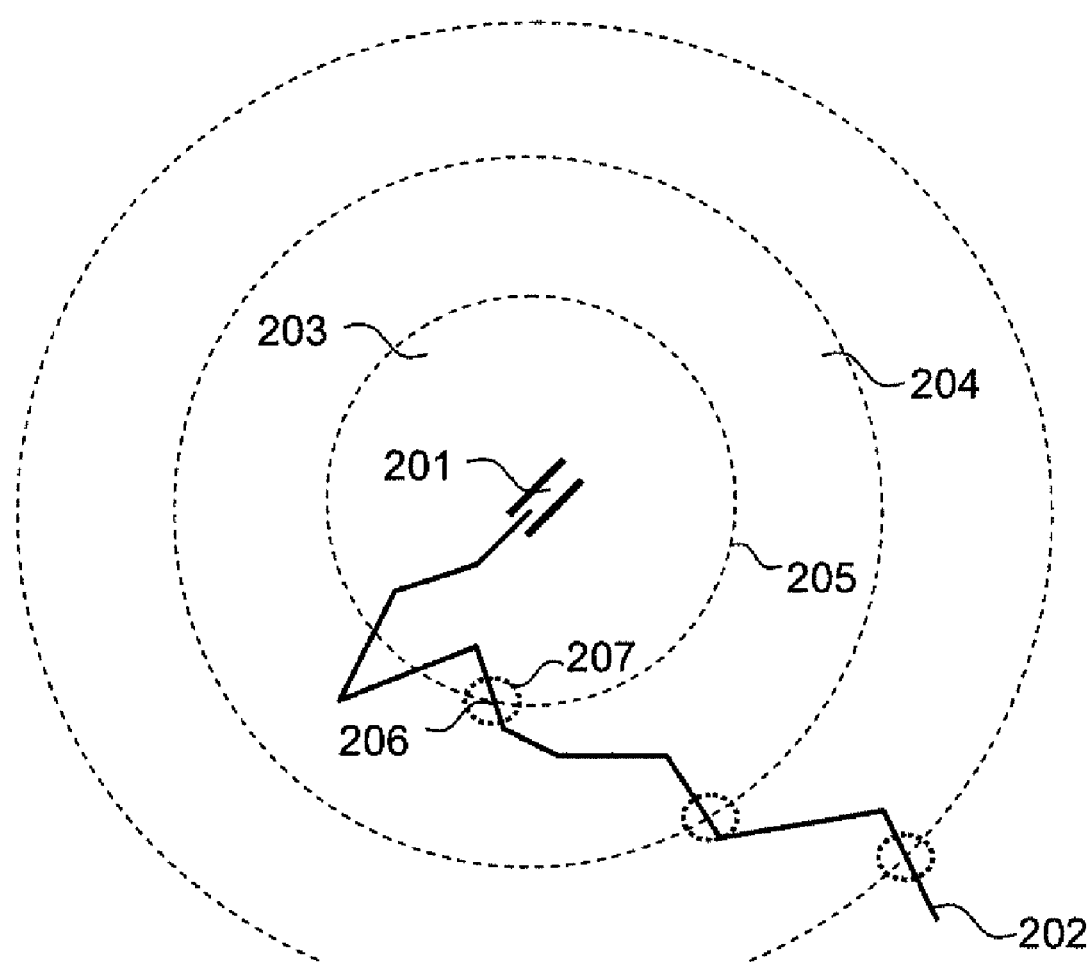
FIG. 2 represents a path of an aircraft, in climb phase, originating from an airport surrounded by zones associated with speed limitations.

FIG. 2 represents a path of an aircraft, in climb phase, originating from an airport 201 surrounded by zones associated with speed limitations. The third step of the method consists in determining zone change points. In the first variant of the inventive method, a zone change point represents the transition from a first zone 203 to a second zone 204 including said first zone 203. Said zone change point is a point of intersection between, on the one hand, the path 202 and, on the other hand, the contour 205 of said first zone 203. If there are several points of intersection between said path 202 and said contour 205, the method retains the last exit point of intersection of each zone, that is, the one located furthest downstream on the path, out of the "valid" points of intersection determined in the preceding step. This point corresponds to a definitive exit from said first zone 203.

The fourth step of the inventive method consists in determining the speed change points from the zone change points calculated in the preceding step. In the first variant of the inventive method, the speed change points 207 are acceleration start points and are placed at the zone change points 206. A speed change point is a point from which the flight management system can apply a new speed set point corresponding to the speed limitation of the second zone.

Figure 3:
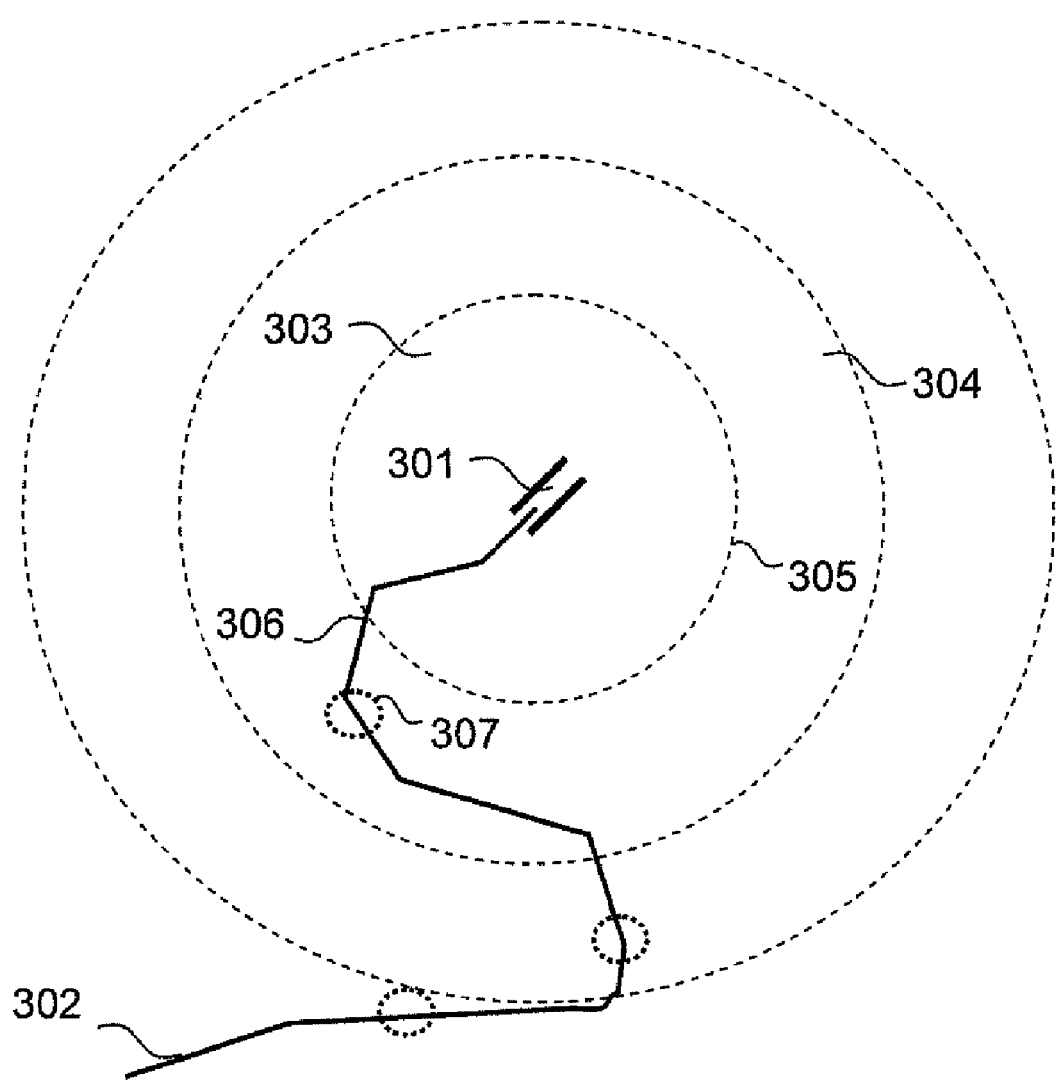
FIG. 3 represents a path of an aircraft, in descent phase, approaching an airport surrounded by zones associated with speed limitations.

FIG. 3 represents a path of an aircraft, in descent phase, approaching an airport 301 surrounded by zones associated with speed limitations. The third step of the method consists in determining zone change points. In the second variant of the inventive method, a zone change point represents the transition from a first zone 304 to a second zone 303 included in said first zone 304. Said zone change point is a point of intersection between, on the one hand, the path 302 and, on the other hand, the contour 305 of said second zone 303. If there are several points of intersection between the path 302 and the contour 305 of the zone, the method retains the first point of intersection of entry into the zone, that is, the one located furthest upstream on the path, out of the "valid" points of intersection determined in the preceding step. This point corresponds to a first entry into said second zone.

The fourth step of the inventive method consists in determining the speed change points from the zone change points calculated in the preceding step. In the second variant of the inventive method, the speed change points 307 are deceleration start points and are placed on the path upstream of the zone change points 306 so as to form a deceleration segment. The length of the deceleration segment corresponds to the distance required for the aircraft to reduce its speed from the preceding speed set point to that applicable to the new zone. A speed change point is a sort of transition point indicating that it is at the sequencing of this point that the guidance of the flight management system FMS changes speed set point to decelerate, and so observe the new speed limitation. The rest of the downstream path is recalculated according to this new applicable speed set point. The inventive method recalculates the point of entry into the next zone and applies the same method, until the path has reached the last limitation zone for the descent.

The pilot can define a numeric value for the limit speed or at least use the "clean" value. If the defined speed is "clean", the value applied will be the "green dot" predicted by the predictions of the FMS once the speed profile is determined. The "green dot" is the minimum speed in smooth configuration (flaps retracted and landing gear retracted), therefore the speed enabling the best climb gradient to be obtained.

In climb mode or in descent mode, the "green dot" is applied at the point of intersection of entry into the limitation zone. However, if the limit speeds imposed by these zones are below the "green dot", the method also calculates the vertical profile as well as the speed profile of the flight plan upstream taking into account aeronautical configuration retractions or extensions (of leading edge slats and high-lift flaps) in order to be able to observe these limitations, by using a method identical to that used for the conventional speed limitations or constraints. For example, in descent, if the speed limitation is less than the "green dot" but greater than the authorized maximum speed for exiting a second aeronautical configuration slot, the FMS considers that this speed limitation will be reached with a single aeronautical configuration slot. The FMS incorporates this hypothesis in its calculations and the deceleration from the last applicable speed set point to the new speed limitation is calculated taking into account a transition from a smooth configuration to a configuration exit slot.

Each time the path of the aircraft is recalculated by the FMS (because of a change of parameters of the aircraft, change of the lateral structure of the flight plan, etc.), the points of intersection with the contours of the speed limitation zones are recalculated, and the speed profile is recalculated.

The invention also relates to a device to assist in navigation in an airport sector applying the inventive method. The inventive device notably comprises means for automatically calculating a speed profile complying with the speed limitations by zones and notably comprising the calculation of speed change points, means for calculating flight parameters notably comprising the speed, trim and thrust, guidance means and means for calculating predictions of parameters associated with the flight profile such as fuel consumption and flight time.

The structure of a flight management system FMS conventionally comprises a central processing unit which communicates with an input/output interface, a program memory, a working memory, a data storage memory, by means of data transfer circuits between these various elements. The device to assist in navigation according to the invention comprises a program implementing the inventive method stored in the program memory of the FMS.

Advantageously, the device to assist in navigation according to the invention also comprises means for inputting and displaying a speed limitation. By pressing a dedicated key, the pilot can select, for a given airport, a speed limitation for each zone containing the airport. The inventive device proposes a default value (either numeric, or defined by the term "clean" meaning that the speed applied as limitation must correspond to the "green dot" of the airplane). The pilot can modify it or even add other limitation values.

Figure 4:
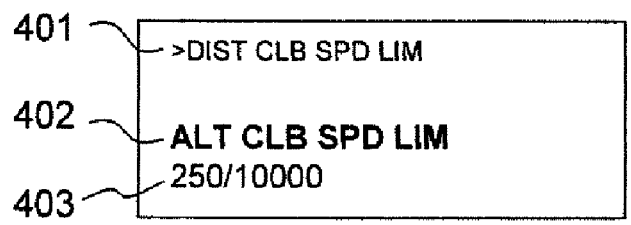
FIG. 4 represents a first exemplary embodiment of the display means of the inventive device.

FIG. 4 represents a first exemplary embodiment of the display means of the inventive device, indicating the type of speed limitation that is active 402 and applicable speed limit 403 and the other type of speed limitation available 401. In this example, the speed limitation depends on the altitude (ALT CLB SPD LIM) and the applicable speed limit 403 is 250 knots under 10 000 feet of altitude.

Figure 5:
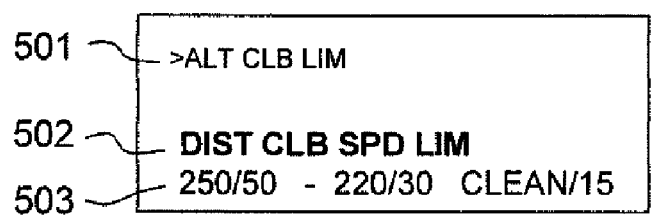
FIG. 5 represents a second exemplary embodiment of the display means of the inventive device.

FIG. 5 represents a second exemplary embodiment of the display means of the inventive device indicating, in a way similar to the preceding example, the type of speed limitation that is active 502 and the applicable speed limit 503 and the other type of speed limitation that is available 501. In this example, the speed limitation depends on the zone where the aircraft is located (DIST CLB SPD LIM). It more particularly concerns limitations by circular zones of respective radii 50 Nm, 30 Nm and 15 Nm. The applicable speed limits 503 are 250 knots at 50 Nm, 220 knots at 30 Nm and the "clean" speed at 15 Nm.

FIGS. 2 and 3 present examples of zone display 203, 204, 303, 304 presenting speed limitations. The contours 205, 305 of these zones are represented by dotted lines.

Figure 6:
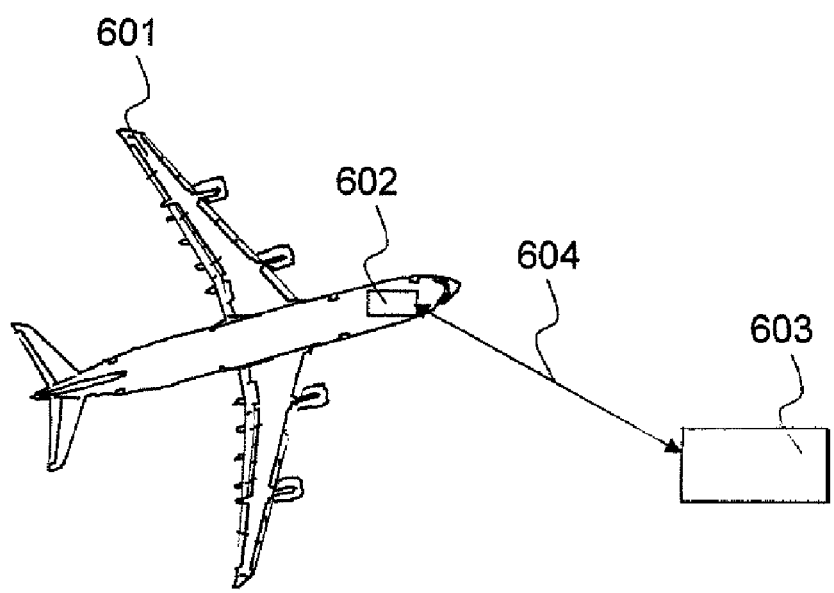
FIG. 6 represents an exemplary implementation of the inventive device.

FIG. 6 represents a system implementing the inventive device. Such a system comprises a first device to assist in navigation according to the invention belonging to a flight management system FMS 602 of an aircraft 601 and a second device to assist in navigation according to the invention belonging to mission preparation aid equipment 603. Such equipment is located outside the aircraft on the ground. The second device also comprises means 604 of transmitting to the flight management system FMS 602 to transmit, for example, a flight plan generated on this equipment 603 to the FMS 602.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of assisting in navigation in an airport sector including an airport, said sector comprising zones having predefined contours, said method automatically calculating a speed profile observing speed limitations, and comprising the following steps:
    calculating a lateral path of a flight plan,
    calculating points of intersection between said path and the contours of said zones by a calculating device belonging to a flight management system or a mission preparation device, said zones being nested within each other so that each of said zones entirely contains the zones of a smaller size, said zones including said airport and being associated with the speed limitations, each zone having a speed limitation lower than the speed limitations of the zones in which it is included,
    calculating zone change points from said points of intersection by a calculating device belonging to the flight management system or the mission preparation device, and
    calculating speed change points from said zone change points by a calculating device belonging to the flight management system or the mission preparation device.

2. The method as claimed in claim 1, wherein said airport is an origin airport of the aircraft and said aircraft is in a climbing phase, a zone change point representing the transition from a first zone to a second zone including said first zone and being the point of intersection between, on the one hand, the path and, on the other hand, the contour of said first zone, the most downstream on said path, corresponding to a definitive exit from said first zone.

3. The method as claimed in claim 2, wherein the speed change points are acceleration start points and are placed at the zone change points.

4. The method as claimed in claim 1, wherein said airport is a destination airport of the aircraft and said aircraft is in descent phase, one of zone change points, representing the transition from a first zone to a second zone included in said first zone, being the point of intersection between, on the one hand, the path and, on the other hand, the contour of said second zone, the most upstream on said path, corresponding to a first entry into said second zone.

5. The method as claimed in claim 4, wherein the speed change points are deceleration start points and are placed on the path upstream of the zone change points so as to form a deceleration segment.

6. The method as claimed in claim 1, further comprising calculating flight parameters notably including speed, trim and thrust.

7. The method as claimed in claim 1, further comprising calculating and displaying predictions of parameters associated with a flight profile including fuel consumption, flight time and predicted speed at each characteristic point of the flight plan.

8. The method as claimed in claim 1, wherein a speed limitation associated with a zone is a value defined by default.

9. The method as claimed in claim 1, wherein a speed limitation associated with a zone is entered manually by the pilot.

10. The method as claimed in claim 1, wherein the speed limitations associated with the zones are dependent on the performance characteristics of the aircraft.

11. The method as claimed in claim 1, further comprising an automatic guidance step defining a flight profile conforming to the calculated flight parameters.

12. The method as claimed in claim 1 is used in flight.

13. The method as claimed in claim 1 is used on the ground for mission preparation.

14. A device to assist in navigation in an airport sector implementing the method as claimed in claim 1, said device comprising:
    a calculating device configured to automatically calculate a speed profile conforming to said speed limitations and notably including the calculation of speed change points,
    a calculating device configured to calculate flight parameters including speed, trim and thrust, and
    a prediction module configured to calculate predictions of parameters associated with the flight profile including fuel consumption and flight time.

15. The device as claimed in claim 14, further comprising a selecting device configured to select a type of speed limitation: dependent on a limitation zone or dependent on an altitude.

16. The device as claimed in claim 14, further comprising a device configured to input and display a speed limitation.

17. The device as claimed in claim 14, further comprising a display device configured to display speed limitation zones.

18. The device as claimed in claim 14, further comprising a guidance device which belongs to a flight management system FMS of an aircraft.

19. The device as claimed in claim 14 belongs to equipment to assist in mission preparation.

20. The device as claimed in claim 19, further comprising a transmitting device configured to transmit to a flight management system FMS.

* * * * *